United States Patent
Johnson et al.

(10) Patent No.: US 8,145,575 B1
(45) Date of Patent: Mar. 27, 2012

(54) PEER TO PEER SHARING OF JOB APPLICANT INFORMATION

(76) Inventors: Craig Johnson, Bixby, OK (US); Tim Crawford, Tulsa, OK (US); Bryan Riddle, Bixby, OK (US)

( * ) Notice: Subject to any disclaimer, the term of this patent is extended or adjusted under 35 U.S.C. 154(b) by 560 days.

(21) Appl. No.: 12/100,521

(22) Filed: Apr. 10, 2008

Related U.S. Application Data

(60) Provisional application No. 60/911,178, filed on Apr. 11, 2007.

(51) Int. Cl.
*G06Q 10/00* (2012.01)
(52) U.S. Cl. .......................................... 705/320; 705/321
(58) Field of Classification Search .................. 705/320, 705/321
See application file for complete search history.

(56) References Cited

U.S. PATENT DOCUMENTS

| | | |
|---|---|---|
| 2002/0072946 A1 | 6/2002 | Richardson |
| 2002/0128894 A1 | 9/2002 | Farenden |
| 2003/0097342 A1* | 5/2003 | Whittingtom ................... 705/75 |
| 2003/0204425 A1* | 10/2003 | Kennedy et al. .................. 705/7 |
| 2004/0148192 A1 | 7/2004 | Morley et al. |
| 2004/0162844 A1 | 8/2004 | Thome et al. |

FOREIGN PATENT DOCUMENTS

| | | |
|---|---|---|
| CA | 2405633 A1 | 3/2004 |
| JP | 1998000256697 A2 | 3/2000 |

OTHER PUBLICATIONS

"Tenstreet Products & Services." www.tenstreet.com/products.htm. Retrieved from www.archive.org, dated Apr. 9, 2006. <http://web.archive.org/web/20060409203554/www.tenstreet.com/products.htm>.*

* cited by examiner

*Primary Examiner* — Jami A Plucinski
*Assistant Examiner* — Amanda Kirlin
(74) *Attorney, Agent, or Firm* — Gable Gotwals

(57) ABSTRACT

A method for peer-to-peer sharing of job applicant verification data over a network includes a computerized central exchange that interfaces with requesters, providers, and job applicants. The exchange manages the interactions of each requester, provider, and job applicant by providing access to a communication channel depending on the classification of requester, provider, and job applicant. The communication channel may be an online interface, a facsimile interface, or an electronically stored data interface. Data stored in the database is used in completing subsequent verification requests involving that job applicant and provider. Job applicants may review and place holds on verification data before the data are transmitted to the requester. The exchange tracks the status of the verification transaction from the time of its receipt to its final disposition and may send a notice to the requester, provider, or job applicant that informs the recipient as to the status of the request.

30 Claims, 4 Drawing Sheets

|  | Providers | |
|---|---|---|
| Requesters | In Network | Out of Network |
| In Network | 1<br>Web Request<br>Web Return | 2<br>Web Request<br>Fax Return |
| Out of Network | 3<br>Fax Request<br>Web Return | 4<br>Fax Request<br>Fax Return |

FIG. 4

PEER TO PEER SHARING OF JOB APPLICANT INFORMATION

REFERENCE TO PENDING APPLICATIONS

This application claims priority to U.S. Provisional Application No. 60/911,178, filed Apr. 11, 2007.

FIELD OF INVENTION

This invention relates generally to employee hiring processes and, more specifically, to employment verification processes associated with the hiring of commercial truck drivers and other job applicants.

BACKGROUND OF THE INVENTION

Federal regulations require that carriers complete a thorough verification process before hiring a commercial driver. A key part of the verification process is inquiring of all employers in the preceding three years. The verification portion of the current process is accomplished by carriers through a mix of manual fax processes, incomplete commercial employment history databases, and phone calls. The result is a time consuming, expensive process for the carrier. For the driver, mistakes in information from previous employers make it difficult to find employment and the process is so opaque that preventing and correcting mistakes is very difficult to accomplish. In addition, an increasing number of industries, including but not limited to banking, education, gaming, and healthcare, are requiring similar verification processes. Therefore, a need exists for a novel approach to the problem that combines unique components of technology and combines them in a holistic approach to the entire process.

BRIEF SUMMARY OF THE INVENTION

The present invention provides a method for peer-to-peer sharing of job applicant verification data over a network. The network includes a computerized central exchange that interfaces with requesters, providers, and job applicants. Requesters are prospective employers seeking verification data about one or more job applicants. Providers are former employers or schools in possession of the verification data of one or more job applicants. The verification data discloses a status of the job applicant during a certain period of time.

The exchange manages the interactions of each requester, provider, and job applicant by providing access to a communication channel depending on the classification of requester, provider, and job applicant seeking access to the exchange. The classification may be based upon a pricing model. The communication channel may be an online interface, a facsimile interface, or an electronically stored data interface. The communication channel being used to receive data from the exchange may be the same as, or different from, the communication channel used to transmit data to the exchange.

The exchange receives a verification request through the communication channel of the requester and compares the request with requirements. In a typical request, an authorization for verification by the job applicant is required. This authorization may be in the form of a digital signature. A unique identifier is assigned to the request and the request is routed to the appropriate provider through the communication channel of that provider. In the case of facsimile transmission, the unique identifier is a bar code. The provider submits the verification data to the exchange and the completed verification data is routed to the requester. The data may be presented in a verification report containing the verification data of one or more of the job applicants.

The job applicant may also provide verification data to the exchange through the communication channel of the job applicant and receive verification data from the exchange. The job applicant has the option of placing a hold status on verification data so that the data may be reviewed and corrected before being stored in the exchange or routed to the requester. Additionally, a verification data form may be displayed to the job applicant as well as to the provider. The job applicant and provider may store a portion of the verification data in a centralized database. Data stored in the database would be used in completing subsequent verification requests involving that job applicant and provider.

Requester, providers, and job applicants may check the status of a verification transaction with the exchange, including checking the status via phone. The exchange tracks the status of the verification transaction from the time of its receipt to its final disposition, including the degree of completion of the verification, the amount of time a request has been pending, and the quality of the verification data. The exchange may send a notice to the requester, provider, or job applicant that informs the recipient as to the status. The notice may be sent through a preferred communication channel of the recipient such as electronic mail, RSS feed, or web.

A better understanding of the invention will be obtained from the following description of the preferred embodiments and the claims, taken in conjunction with the attached drawings.

BRIEF DESCRIPTION OF THE DRAWINGS

FIG. 4 is a table that presents ways in which combinations of requesters and providers interface with the exchange.

DETAILED DESCRIPTION OF THE PREFERRED EMBODIMENTS

The invention described below is not limited in its application to the details illustrated in the accompanying drawings. The invention is capable of other embodiments and of being practiced or carried out in a variety of ways. The phraseology and terminology employed herein are for purposes of description and not limitation.

A network according to this invention encompasses all parties in the verification process: prospective employers who need to request previous employment, accident, and drug and alcohol testing-related information; former employers who are obligated to provide employment-related information; and drivers who rely on the process to qualify themselves for employment. The network manages the complexity associated with different parties participating in different ways with the network so that individual participants do not have to manage it for themselves. The network is preferably delivered to users via the web, fax, and database access. The peer-to-peer nature of the network explicitly creates ways for parties of all sorts to participate, for example, former employers, prospective employers, employees, creditors, background check providers, and school systems. Most corporate participants will utilize the network both as providers (former employers) and requesters (prospective employers) and the network adds value to those joint participants by offering a single system for managing all of their employment verification process.

Figure 1:
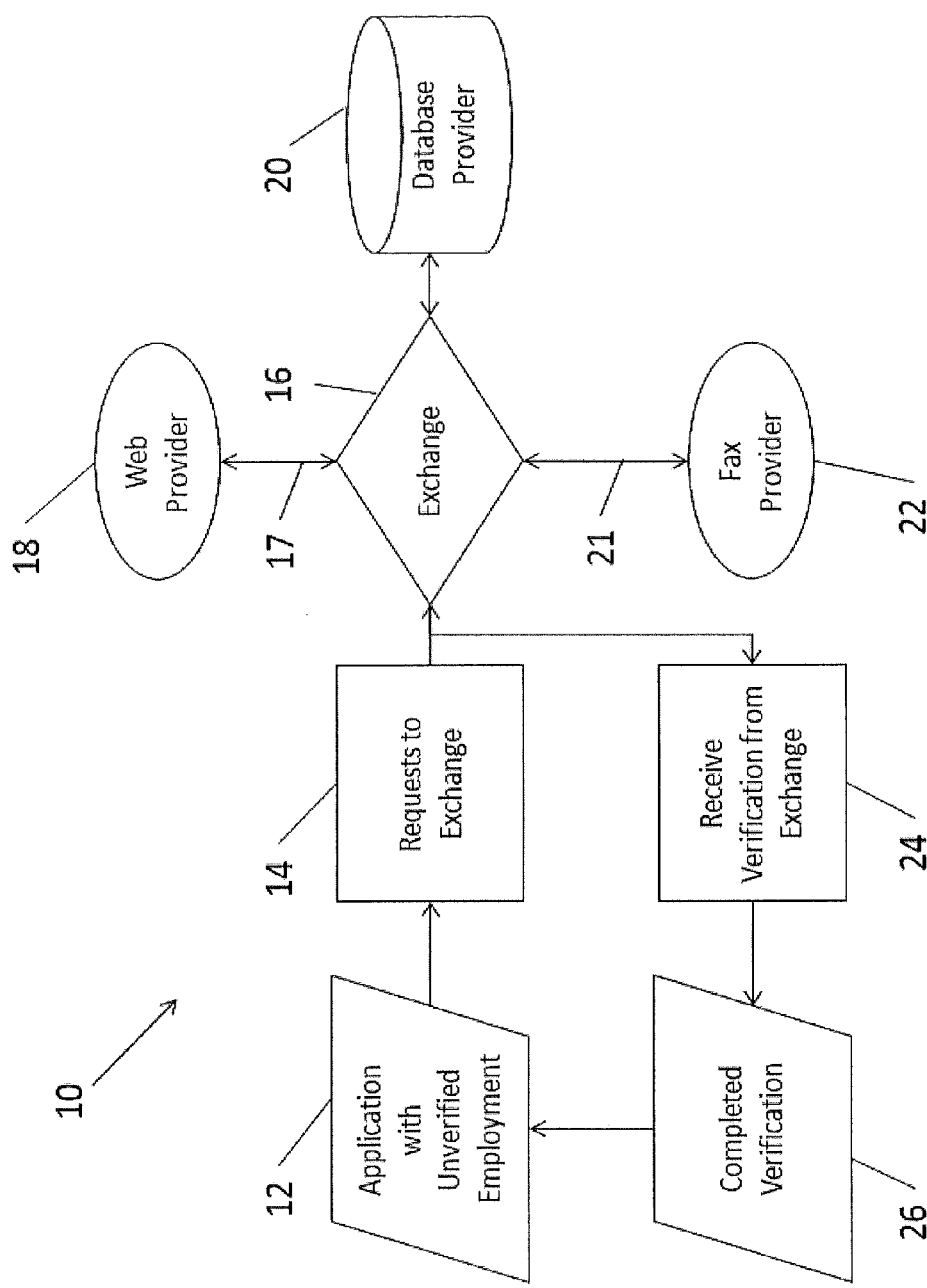
FIG. 1 is a macro-level flow diagram of a network for managing verification data from a prospective employer's point-of-view. The prospective employer receives an employment application and submits a request for verification to a central computerized exchange.
Figure 2:
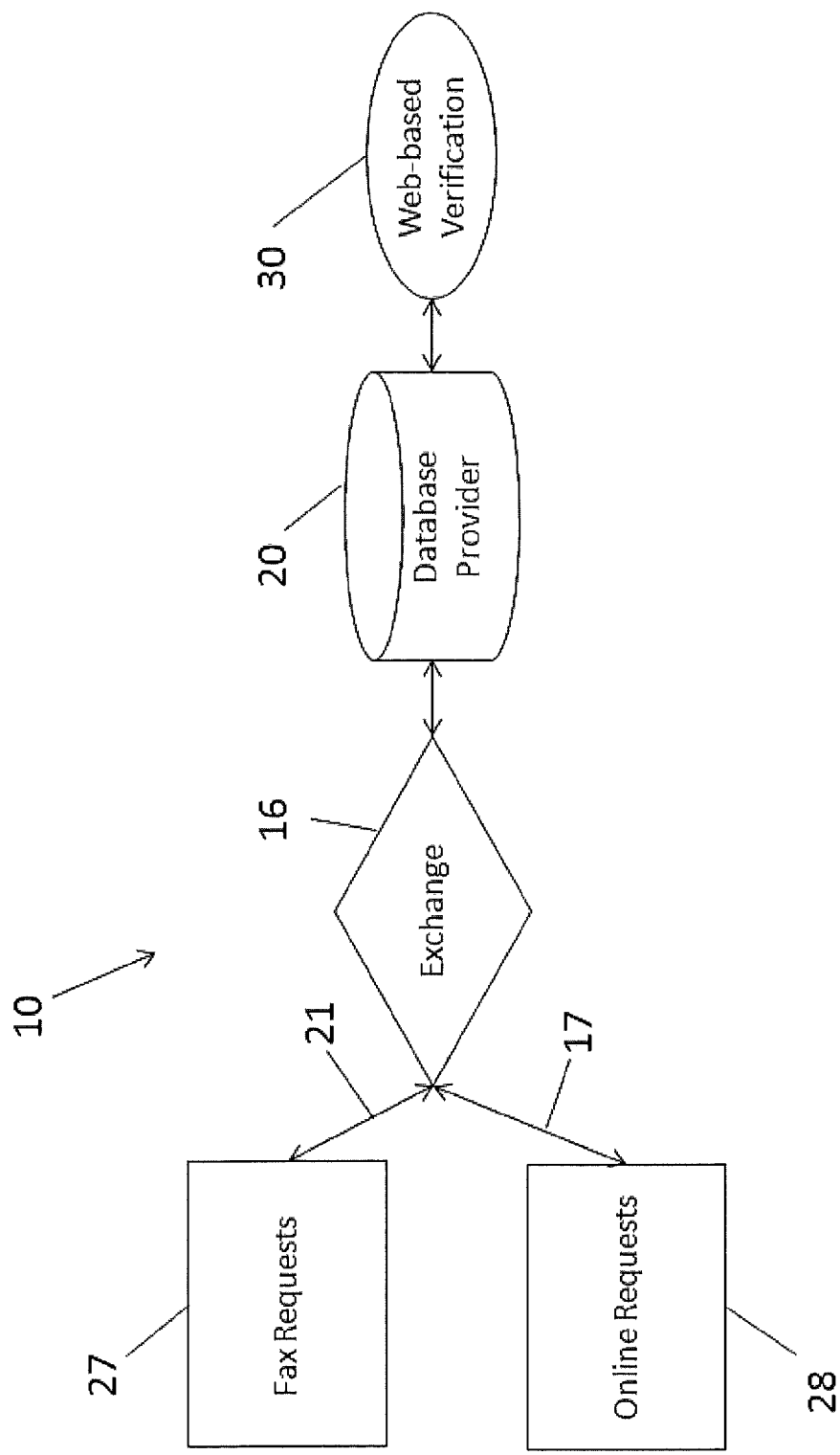
FIG. 2 is a macro-level flow diagram of the network from a former employer's point-of-view. The former employer provides verification data to the central exchange.
Figure 3:
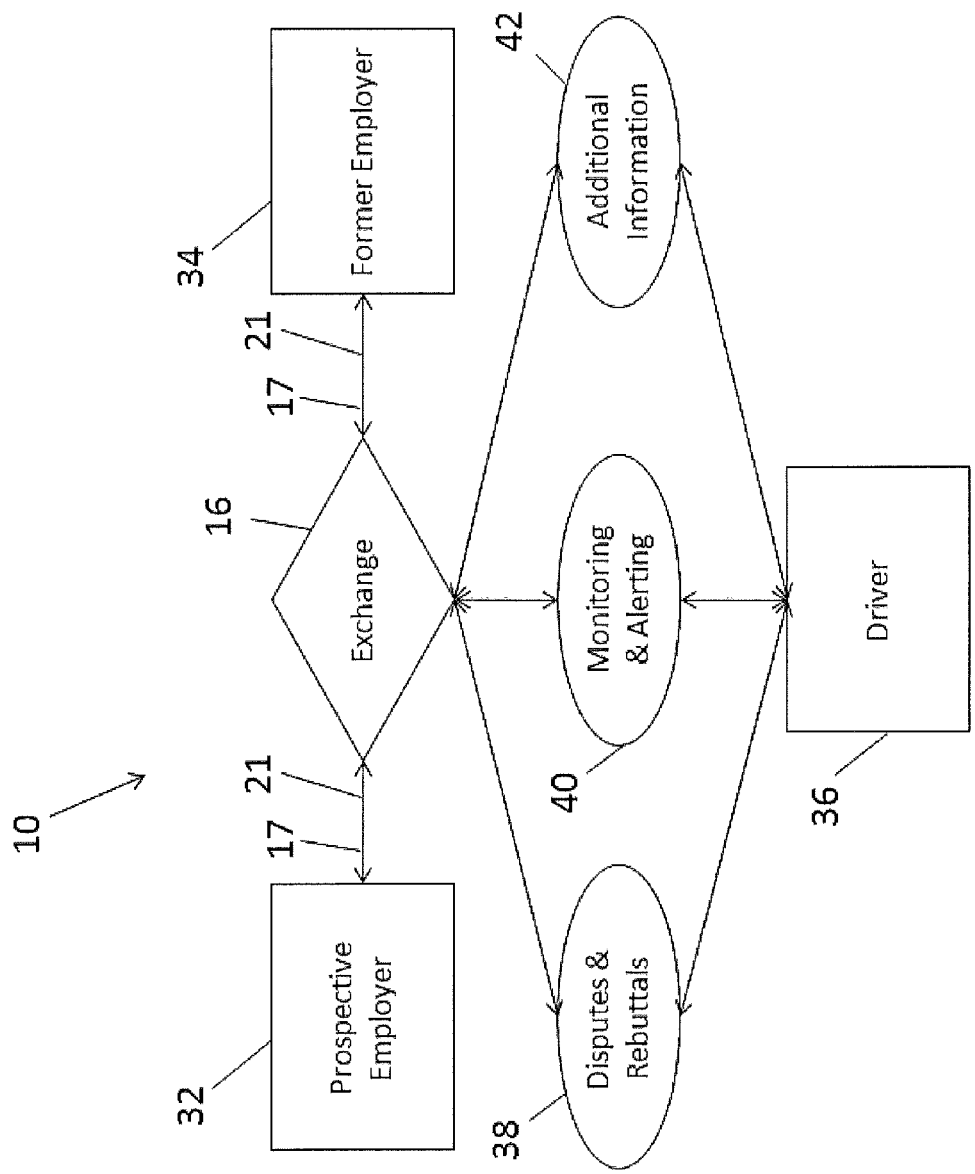
FIG. 3 is a macro-level flow diagram of the network from a job applicant's point-of-view. The job applicant receives alerts from the exchange and may provide information to the exchange.

Referring now to FIGS. 1 to 3, a requester 32 receives an application 12 that contains employment-related information in need of verification. Requester 32 submits a request 14 to a central exchange 16. Request 14 may be submitted to exchange 16 either using data provided by the applicant through a commercial software application product or by entering request 14 directly into exchange 16 and specifying applicant and employer information. In a preferred embodiment, applicant 36 was a truck driver; Tenstreet IntelliApp™ recruiting software provided the data for request 14.

Exchange 16 manages the complexity of routing request 14 through the proper channel to the appropriate provider 34. As discussed in detail below, provider 34 may interact with the exchange as a web provider 18 or a fax provider 22. Alternatively, a central database 20 may provide the needed verification data. Exchange 16 also handles any follow-up needed with requester 32, provider 34, and applicant 36, and captures the returned verification information 24 for requester 32. The completed verification 26 is then routed to requester 32. As online participation in network 10 grows, requester 32 does not need to change any part of their process to gain the benefits of the expanded online community.

In contrast to network 10, current industry practices involve a provider 34 managing requests 14 through a number of channels, including fax requests 27 and online requests 28. This approach prevents providers 34 from gaining much efficiency on any one channel 27, 28 and complicates how they can fulfill their legal compliance obligations relating to the accuracy and correction of data they share with various requesters 32. With exchange 16, all requests 14 for a provider 34 would be managed through one channel, preferably a web-based channel 17 and a fax channel 21, making corrections and additions much easier to manage. In addition, providers 34 would have the option of saving their responses to central database 20 so that subsequent inquiries on the same former employee 36 would be fulfilled automatically by exchange 16.

While a driver 36 currently has a number of protections under FCRA and DOT regulations against inaccurate data being shared with prospective employers, the practical reality is that it is often difficult to utilize those protections. In many cases, driver 36 must first experience being turned down for a job and discover well after that incorrect information is the cause. Drivers 36 may participate in exchange 16 to not only exercise their rights according to the laws but exchange 16 goes well beyond what current law requires. Drivers 36 will have the ability to be notified 40 when information is being shared about them and have the ability to put their information into a hold status 38. In addition, they will also be able to securely provide information 42 about themselves to make themselves more attractive to prospective employers 32. Additional information 42 includes but is not limited to driving records and criminal background checks.

Access to exchange 16 will be preferably delivered to two distinct communities—in-network requesters 32 and providers 34 and out-of-network requesters 32 and providers 34—via two distinct channels 17, 21. In-network participants 32, 34 will preferably interact with exchange 16 primarily through a web-based interface 17. Out-of-network participants 32, 34 will preferably interact with exchange 16 primarily via fax interface 21. Referring now to FIG. 4, in which each quadrant is identified by number, four types of interactions are contemplated by exchange 16. Exchange 16 is involved in every quadrant where there is at least one in-network participant 32, 34, namely, Quadrants 1, 2, and 3.

In Quadrant 1, requester 32 passes an online request 28 via web-based interface 17 to exchange 16. Request 28 may optionally originate in a commercial software application product such as Tenstreet DES™ applicant tracking system, and may include signed releases such as Tenstreet IntelliApp™ with digitized signature. Alternatively, in-network requester 32 may create a request 28 without using a commercial software product.

Depending on the verification information requested, requester 32 may be required to upload or submit via fax channel 21 a signed release. Requester 32 may have the option to either upload an electronic image of the release or can invite driver 36 to sign a release online. If requester 32 opts to fax in the release, exchange 16 will generate a release cover sheet with a barcode present that denotes which request 14 and which provider 34 the release is to be associated with.

After faxing the release to exchange 16, requester 32 will have to confirm that the release is correct before exchange 16 will transmit the release to provider 34. Provider 34 will be notified electronically that there is a pending request according to their predefined preferences. Predefined preferences include but are not limited to email, RSS feed, and web. Provider 34 will be shown an online data entry form that will capture all data elements required to complete the verification. The data entry form will also show provider 34 the signed release. After the data entry process is complete, provider 34 will have the option of storing all the verification data in a central database 20. All future requests 14 for that provider 34 for that former employee 36 would be fulfilled from database 20 without any further interaction from provider 34.

Provider 34 would be given online visibility 30 to all the verification data stored in the exchange database 20. In addition, providers 34 would have the option of bulk importing employment verification data to database 20 if they have information already accumulated in electronic form. Both provider 34 and requester 32 will be alerted to pending requests 14 that stay pending for more than a short period of time (e.g., 2 to 3 days, based on individual preference) or that are pending near the regulation required by current law (i.e., a 30-day response window). Requester 32 will be notified that the verification has been completed.

In Quadrant 2, requester 32 would initiate online request 28 identically to the steps outlined in Quadrant 1. Exchange 16 manages all differences between in-network and out-of-network providers 34. Out-of-network provider 34 would receive a faxed verification request with a barcode that associates the pages of the fax to the initiating request 28 in exchange 16. Exchange 16 will keep track of failed faxes (due to busy signals, ring no answer, etc.) and alert requester 32 when a fax number appears to be errant.

Provider 34 will fulfill request 28 like they would any other verification request 14—by manually completing the blank forms submitted in the original fax and sending the completed form via fax. The return fax number will be the fax number for exchange 16. When the completed verification is received by exchange 16, exchange 16 will read the barcode and attach the completed verification to the initiating request 28 Requester 32 will be notified that the verification has been completed and will be able to see the received fax as well as optionally transcribe the received information into database 20.

Provider 34 would have the ability to sign up as an in-network provider based upon the barcode on the faxes received and, as an in-network provider, all future requests from all in-network requesters 32 would be routed electronically by exchange 16 to provider 34.

In Quadrant 3, out-of-network requesters 32 would be directed to submit all verification requests 26 for a given provider 34 to exchange 16. The process would involve a registration process and authorization of provider 34. Requester 32 would have a limited access to exchange 16 and they would submit requests 27 and receive completed verifications 26 according to the process described in Quadrant 1. Because no requests 27 for these requesters 32 would come from a commercial software application, requester 32 would have to upload the signed release, print the cover sheet, and fax the release or invite the driver 36 to sign a release on-line. The in-network provider 34 would complete the verification process in the same way as that for requests 28 from in-network requesters 32 in Quadrant 1.

Both DOT regulations and federal law impose certain obligations on requesters 32 and providers 34. Exchange 16 provides all the tools necessary for providers 34 and requesters 32 to remain fully compliant with their legal obligations. Once drivers 36 have been authenticated by exchange 16, they will have the ability to receive all information stored and communicated about themselves. In addition, exchange 16 offers drivers 36 the ability to proactively monitor all information being communicated in real-time, not just after an adverse action occurs as the regulations require. Drivers 36 will be notified every time information is being sent across exchange 16 or have the option to hold all information without the explicit permission of driver 36 to release the information. Also, drivers 36 will have the ability to add information into the exchange 16. Drivers 36 would be able to reliably store information such as driving records and criminal background checks in an effort to make themselves more attractive to prospective employers 34.

What is claimed is:

1. A method for peer-to-peer sharing of job applicant verification data over a network, the network comprising; a computerized exchange being in communication with one or more requesters, providers, and job applicants; the exchange managing one or more interactions of each requester, provider, and job applicant with the exchange; each requester being an entity seeking verification data about one or more job applicants, each provider being an entity in possession of the verification data of one or more job applicants and providing the verification data in response to a request for the verification data, the verification data disclosing a status of the job applicant during a period of time; said method comprising the steps of:

allowing one or more communication channels to interface with the exchange;
   assigning an attribute to each requester, provider, and job applicant, the attribute defining the communication channel accessible to each requester, provider, and job applicant in transmitting data to the exchange and receiving data from the exchange;
   receiving a verification request from a requester through the communication channel of the requester;
   comparing, by the computerized exchange, the verification request with requirements;
   routing the verification request to a provider through the communication channel of the provider;
   receiving verification data provided by the provider in response to the verification request through the communication channel of the provider; and
   routing the received verification data through the communication channel of the requester;
   wherein at least one requester is also a provider for a second requester and at least one provider is also a requester for a second provider, the at least one requester providing verification data to the exchange for a period of time in which a respective job applicant was employed by the at least one requester and the second provider providing verification data to the exchange for a period a time in which the same or a different respective job applicant was employed by the second provider.

2. A method according to claim 1, the job applicant being a truck driver.

3. A method according to claim 1, the communication channel being at least one channel selected from the group consisting of an online interface, a facsimile interface, and an electronically stored data interface.

4. A method according to claim 3, the online interface comprising a wireless device.

5. A method according to claim 3, the communication channel being used to receive data from the exchange being the same as the communication channel used to transmit data to the exchange.

6. A method according to claim 3, the communication channel being used to receive data from the exchange being different than the communication channel used to transmit data to the exchange.

7. A method according to claim 1 further comprising the step of denying access to a portion of the exchange based upon the attribute assigned.

8. A method according to claim 1 further comprising the step of assigning a unique identifier to the verification request.

9. A method according to claim 8, the unique identifier comprising a bar code.

10. A method according to claim 1, said comparing step further comprising the step of obtaining an authorization for verification from at least one of the provider and the job applicant.

11. A method according to claim 10, the authorization for verification comprising a digital signature.

12. A method according to claim 1, said comparing step further comprising the step of obtaining a refusal of authorization for verification from the provider.

13. A method according to claim 12, the refusal of authorization for verification comprising a digital signature.

14. A method according to claim 1 further comprising the step of receiving verification data through the communication channel of the job applicant.

15. A method according to claim 1 further comprising the step of routing verification data from the provider to the job applicant.

16. A method according to claim 15 further comprising the step of placing a hold status on the verification data.

17. A method according to claim 16 further comprising the step of correcting the verification data before releasing the hold status.

18. A method according to claim 1 further comprising the step of checking a status of a verification transaction with the exchange.

19. A method according to claim 18, the communication channel being a phone interface.

20. A method according to claim 18, the status of the verification transaction being one of a receipt state, a transmission state, a completion state, a time state, and a quality state.

21. A method according to claim 18, said step of checking a status of the verification transaction further comprising the step of sending a notice to at least one of the requester, provider, and job applicant, the notice informing a recipient as to the status of the verification transaction and being sent through the communication channel of the recipient.

22. A method according to claim 18, the notice being sent through a preferred communication channel of the recipient, the preferred communication channel being selected from the group consisting of electronic mail, RSS feed, and web.

23. A method according to claim 1, further comprising the step of displaying a field of a verification data form to at least one of the requester, provider, and job applicant.

24. A method according to claim 1 further comprising the step of storing a portion of the verification data in a centralized database.

25. A method according to claim 24, the database being used to provide a portion of the verification data.

26. A method according to claim 1 further comprising the step of generating a verification report containing a portion of the verification data of one or more of the job applicants.

27. A method according to claim 1, said assigning step based upon a pricing model, the pricing model defining at least one or more categories of users.

28. A method according to claim 27 wherein the pricing model is a flat fee.

29. A method according to claim 27 wherein the pricing model is a transaction-based pricing based upon usage of the network.

30. A method according to claim 11 wherein the authorization for verification is stored by the exchange and transmitted to the at least one of the provider and the job applicant providing the authorization for verification along with the request for verification data.

* * * * *